Lyman & Baldwin.
Hay Loader.
Nº 5587. Patented May. 16, 1848.
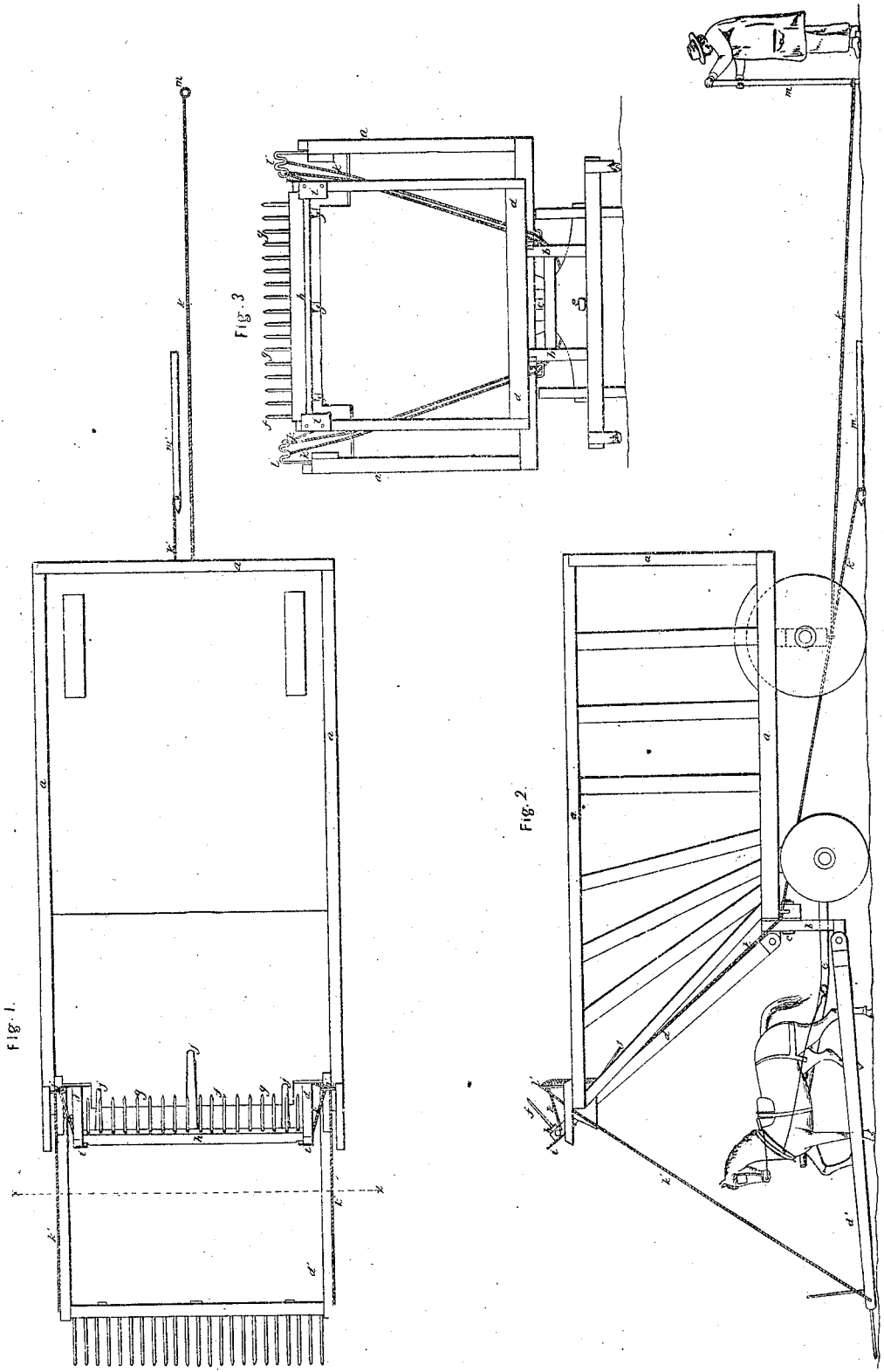

UNITED STATES PATENT OFFICE.

W. W. BALDWIN AND A. S. LYMAN, OF PHILADELPHIA, PENNSYLVANIA.

IMPROVEMENT IN HORSE-RAKES.

Specification forming part of Letters Patent No. 5,587, dated May 16, 1848.

*To all whom it may concern:*

Be it known that we, M. W. BALDWIN and A. S. LYMAN, of the city and county of Philadelphia, in the State of Pennsylvania, have invented a new and useful Horse-Rake for Raking and Loading Hay, &c.; and we do hereby declare that the following is a full, clear, and exact description of the principle or character which distinguishes it from all other things before known, and of the manner of making, constructing, and using the same, reference being had to the accompanying drawings, making part of this specification, in which—

Figure 1 is a plan of the rakes attached to a hay-wagon; Fig. 2, an elevation of the same, and Fig. 3 a cross vertical section taken at the the line X X of Fig. 1.

The same letters indicate like parts in all the figures.

The nature of our invention consists in raking the hay by means of two rakes attached each to the forward part of an appropriate frame jointed to the forward part of a hay cart or wagon, one frame being shorter than the other, that the rake which it carries may clear and work within the other, so that as soon as one is filled it shall be elevated to deposit the hay in the wagon, the other in the meantime receiving the charge, and vice versa, the rakes being operated during the forward movement of the wagon by means of ropes operated by the attendant or by the rotation of the wagon-wheels.

In the accompanying drawings, *a* represents a four-wheeled wagon, of the usual construction, for gathering hay, to the forward part of which is connected a vertical frame, *b*, by means of a screw-bolt, *c*. To the upper part of this frame is jointed a frame, *d*, made of sufficient length to reach the upper edge of the hay-box of the wagon, and to swing, when moved up and down, clear of the horses, that are harnessed to the tongue *e* of the wagon in the usual manner. The forward part of this frame carries a rake, *f*, consisting of a series of teeth, *g*, projecting from the forward edge of a straight beam or shaft, *h*, having journals at each end that turn in the side pieces of the frame *d*. The beam of this rake is flat, and each of the side pieces of the frame is provided with a flange, *i*, on which the flat face of this beam rests, to prevent the rake from turning only so far as to bring the teeth to a horizontal position when the frame is let down, their weight always insuring this, and one corner of the beam is rounded to permit the rake to make a quarter-revolution backward when the frame is thrown up against the front of the hay-box, the weight of the hay resting against pins or arms *j j j*, that project from the beam of the rake and at right angles with the teeth, these pins or arms having the effect, also, to retain the hay as the rake is moved forward to receive its load. Another frame, *d'*, similar in every respect to the one just described, except that it is wide enough to play freely outside of it and long enough to work clear of the first rake, is jointed or hinged to the lower edge of the frame *b*, and this second frame is provided, in like manner, with a rake of similar construction, and operated and connected in the same way. To the forward end of each of these frames there are two ropes, *k k k' k'*, attached one at each side, which pass up through guides *l' l'* at the top and forward part of the hay-box, and from these guides the ropes pass down in front of and under the wagon, the two for each frame being united in one, and these attached each to a hand-lever, *m m'*, made with one end sharp to penetrate the earth with facility, the ropes being attached to them near to the sharp end, so that the attendant can have a strong purchase when the sharp end is struck into the ground, and thus enable the forward motion of the wagon to elevate either of the frames with the rake charged with hay, and thus discharge it into the hay-box. When discharged the attendant liberates the lever, which is drawn out of the ground to permit the frame to descend as the attendant strikes the other lever in the ground to elevate the other frame and rake, which in the meantime has received its charge of hay. In this way the rakes are alternately charged, elevated, and discharged, and again let down by the attendant alternately operating the levers attached to the ropes.

The frame *b*, to which the rake-frames are jointed, being connected with the forward part of the wagon by a longitudinal bolt, *c*, permits the rake-frames to vibrate and adapt themselves to the lateral undulations of the surface of the ground, while the joints on which they turn, to admit of their being elevated, permit of their following the direct undulations.

The rake-frames, it will be seen, are to be made of sufficient length to swing clear of the horses, the height of the hay-box of the wagon admitting of this.

It will be obvious from the foregoing that the rake-frames, instead of being jointed to the vibrating frame $b$, may be jointed or hinged directly to the forward part of the wagon, taking care to make the joints of attachment of the shorter one higher than for the other, that when thrown up the rake may pass clear of the upper edge of the hay-box; and that the rake-frames, instead of being operated by the hand-levers, may be lifted and let down by the turning of the wagon-wheels by simply attaching the ropes to windlasses on the rear axle-tree, which can be clutched and unclutched with facility, either by a hand-lever or by a cam, on either of the wheels; but such an arrangement would render the apparatus more costly and liable to derangement, and the hand-levers, from the facility with which they can be operated, are deemed the best. Instead of simply attaching the ropes to the rake-frames and passing them through the guides or over pulleys attached to the wagon, this may be modified by attaching to each side of the rack-frame a segment of a circle with a deep groove in it, in which the rope attached to the rake-frames passes, so that, (the segment extending up from the upper side of the rake-frames,) the ropes resting on the periphery of the segments, they can pass over the body of the wagon or by the side of it without the necessity of using either guides or pulleys.

The horses, if desired, may be harnessed to the sides or the back of the wagon, or if the hay-box be so low as not to require the rake-frames to be made of sufficient length to swing over the horses.

If desired, the beam of the horse-rakes may be provided with an arm or arms so located as to strike against the hay-box when thrown up to insure the turning of the rake to deliver the hay. Instead of the two rake-frames acting alternately, one only may be used by stopping the horses whenever the rake is charged to elevate and discharge the hay.

What we claim as our invention, and desire to secure by Letters Patent, is—

The method, substantially as herein described, of raking and elevating hay and delivering it into a wagon or other receptacle by means of the rake-frames so jointed or otherwise connected with the wagon as to admit of being elevated to raise and discharge the hay into the hay-box of the wagon or any other receptacle, as described.

M. W. BALDWIN.
A. S. LYMAN.

Witnesses:
JOHN A. WHITE,
LANE SCHOFIELD.